April 27, 1965 C. C. CONNELL 3,180,594
ENGINE MOUNT
Filed Jan. 7, 1963
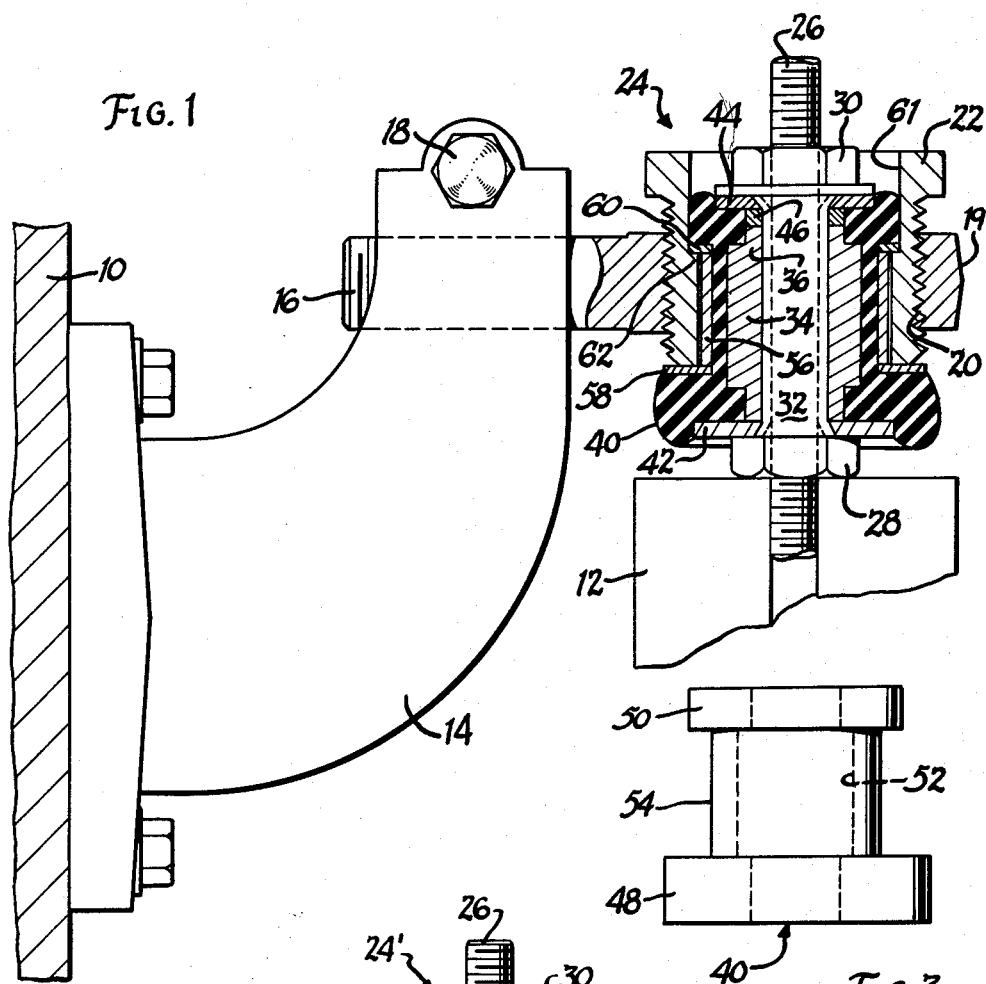
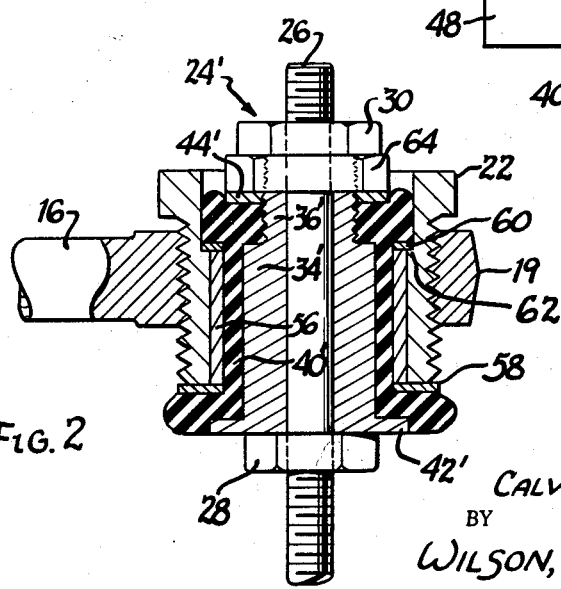
INVENTOR.
CALVIN C. CONNELL
BY
WILSON, SETTLE & CRAIG
ATTORNEYS United States Patent Office 3,180,594
Patented Apr. 27, 1965

3,180,594
ENGINE MOUNT
Calvin C. Connell, Birmingham, Mich., assignor to Crusader Marine Corporation, Warren, Mich., a corporation of Michigan
Filed Jan. 7, 1963, Ser. No. 249,917
6 Claims. (Cl. 248—9)

This invention relates to anti-vibration mountings, and particularly to those which can be adjusted both to change the position of a supported body and to change the damping characteristics of the mounting. It is especially, but not exclusively useful in mounting engines in boats. Such engines are frequently bolted at three points to metal pads or wooden stringers fastened to the hull. Easy adjustment of position is necessary to align the engine crank shaft with a driving shaft which may be a propeller shaft or part of the drive line. Also it is desirable to be able to adjust easily the damping or vibration-transmitting characteristics of the mounting.

These two adjustments attack a very complex problem which is not fully understood. An engine having a given design and structure is intended to be installed in a wide variety of boats. The amplitude and frequency of the resultant vibrations generated by the engine-boat combination are changed over wide ranges by the many factors. These include the number of engines and their position, such as tilt in a fore-and-aft plane of the engine; by many constants of the hull such as shape, size, material, stiffness and other things; by the period of natural vibration of the propeller shaft, and by many characteristics of the wheel or propeller.

I have found that vibration can be controlled to an acceptable degree, or substantially eliminated by adjusting the position of the engine and vibration-transmitting or damping characteristics of the engine support, and that solution of the complex problem of vibration can be achieved more readily by making such adjustments.

Accordingly it is among the objects of the invention to provide an improved method of controlling vibration transmission, and to provide an improved resilient vibration damping mount in which the damping characteristics of a resilient element can be readily adapted to the vibration characteristics of a vibrating system, especially such a mount having adjusting means for the damping characteristics which can be adjusted while the mount is assembled in the system.

Another object is to provide an improved vibration damping mount in which adjusting means is locked in its adjusted position by means which secures the mount to a base.

Another object is to provide a damping mount in which a resilient damping element can be stressed, and especially adjustably stressed, in mutually perpendicular directions, between a vibrating body and a supporting base for such body.

Other objects of this invention will appear in the following description and claims, reference being had to the accompanying drawings forming a part of this specification wherein the same reference character designates the same part, wherever it occurs.

FIGURE 1 is a side elevation view partly in section of one form of motor mount embodying the present invention, the resilient support thereof being shown in vertical, axial section and the resilient element of such support being shown stressed.

FIGURE 2 is an axial section of a modified form of the resilient support of the motor mount, the resilient element being shown stressed; and FIGURE 3 is an elevation of a resilient element or bushing, unstressed, forming part of the resilient support.

Before explaining the present invention in detail it is to be understood that the invention is not limited in its application to the details of construction and arrangement of parts illustrated in the accompanying drawings, since the invention can be embodied in other forms and can be carried out in various ways. The wording of the description is illustrative only, and does not limit the invention.

Referring to the drawings, an engine 10 to be supported on a stringer 12 of a boat hull, is bolted to a side arm or bracket 14 having at its free end a split eye, as is known, for adjustably holding one end of a rod 16 which is held fixed in the bracket by a bolt 18. The other end of the rod is formed into a ring 19, internally threaded, as indicated by 20 to receive a threaded bushing or sleeve 22 the purpose of which is to adjust the position of the motor vertically with respect to the stringer, as will be explained. The motor is held adjusted horizontally with respect to the stringer by the rod 16 and bolt 18.

The sleeve 22 forms part of a resilient support or mount generally designated by 24, between the engine and the stringer to which the resilient mount may be secured by a bolt or stud 26, having an engine supporting shoulder 28 (which may be a nut) on which the mount 24 rests, and a nut 30 by which the mount is clamped against the shoulder and held down. The mount may have a central tube, sleeve, or core 32 for receiving the bolt 26. Surrounding the core is a tubular spacer 34 preferably having a portion 36 of reduced diameter at one end. A resilient bushing 40, which in repose has the form shown in FIG. 3 surrounds the spacer and is axially confined between radial flanges or washers 42 and 44. The flange 42 may be integral with the spacer 34 or may be separate from it.

The flanges 42 and 44 are bored to pass over the sleeve 32 and are countersunk to receive the ends of the sleeve, flared after the bushing, spacer and flanges are assembled, to secure these parts to each other. Preferably the spacer consists of at least two axial sections, one section being a washer 46 which is in effect an extension of the reduced end 36. The purpose of this will be explained.

The bushing has a pair of end flanges 48 and 50 between which is a recess 52 which receives and supports a carrier now to be described. The carrier includes a tube or sleeve 56 having a pair of end flanges 58 and 60, one or both of which may be separate washers. The larger lower flange 58 (which can be integral with sleeve 56) supports the lower end of outer sleeve 22 and thus transmits the weight of the engine through the resilient bushing 40 to the stringer 12. Both the sleeve 56 and the inner surface 61 of the adjusting bushing 22 transmit side thrust or lateral vibration from the engine through the bushing 40 to the stringer, and the top flange 60 holds the engine down by bearing on a shoulder 62 formed in the bushing 22. The lower flange 48 of the resilient bushing is axially thicker than the upper flange 50 need be, to support the weight of the engine. The upper flange can be radially thick on account of the reduced diameter of the end 36 of the spacer 34 to provide additional material to absorb lateral vibrations.

Before the mount is assembled the axial length of the resilient bushing 40 in repose, is greater than the assembled length, which latter is shown in FIG. 1, and the bushing has the form shown in FIG. 3. The assembly compresses the bushing axially and stresses the material of the bushing radially between the spacer 34 and the sleeve 56, and stresses the material of the bushing axially between flanges 58 and 42 and between the spacer 34 and washer 44. The amount of this stress influences the damping characteristics of the mount. The stress is selected to suit desired conditions by selecting the amount of axial compression. In the case of certain rubber, as is known, the material is virtually incompressible, but the structure can be compressed in one direction by letting the material flow in other directions. The axial compression is determined, for a given material, by selecting the repose and final lengths of the resilient bushing. This, in turn, is determined by selecting the desired length of the core tube 32 and the required axial space occupied by the required number of washers 46, if any.

When the device is assembled, the spacer 34, with integral or separate end flange 42, is slid over the core 32 of appropriate length, the lower end of which may be previously flared. The resilient bushing may then be slid over the spacer. Alternatively the resilient bushing may have been previously molded on, or cemented to the spacer and lower flange. Then the carrier sleeve 56 with integral or separate flange 58 is assembled in the recess 54 of the resilient bushing. The upper flange 50 of the bushing can be deformed to pass through the smaller diameter of the sleeve 56, due to the space between the resilient bushing and the tube 32 which is later filled by the washer 46. Then the adjusting sleeve 22, previously threaded into the ring 19 and washer 60, are assembled with the sleeve 56 over the resilient bushing, the flange 50 being again distorted to pass through parts of smaller diameter. Finally the appropriate number, if any, of washers 46 of the required thickness, are inserted, the top washer 44 is pressed down over the end of the tube 32, and the tube is flared into the countersink of the washer 44 to hold the assembly together. In this operation the desired radial and axial stress is imparted to the material of the resilient bushing, which may flow between flanges 58 and 42 and between washer 44 and sleeve 22 as shown in FIG. 1. The flanges 42 and 44 are secured to each other and to the spacer 34 in rigid metal-to-metal contact. The flanges 58 and 60 are secured to each other and to the sleeve 56 in metal-to-metal contact, by the force of the resilient bushing. Sufficient clearance is provided between the adjusting bushing 22 and the carrier formed by sleeve 56 and flanges 58 and 60 to permit the adjusting bushing to turn on the carrier.

When the engine is mounted on the stringers 12, it is contemplated that three or four mounting brackets may be used. Each mount is secured adjustably to the stringer by clamping it between nuts 28 and 30, the position of which determines the height of the mount 24. The adjustment of the bushing 22 in the ring 19 determines the height of bracket 14. The bushing 22 is provided with a suitable wrench-hold for turning it. The position of rod 16 in the bracket 14 determines the lateral position and horizontal alignment of the engine.

In the form of the invention shown in FIG. 1 the characteristics of the mount can be selected when the mount is assembled, but cannot be changed after the engine is placed in a boat. The form shown in FIG. 2 permits changing the characteristics easily and from time to time in any boat-engine combination.

In FIG. 2 each part bearing a number not primed is the same as the like-numbered part in FIG. 1. Each part bearing a prime number in FIG. 3 corresponds functionally to the part in FIG. 1 having a like number not primed, but its structure is modified.

The difference between FIGS. 1 and 2 is in the construction of the spacer and means for holding it together, which permits the adjustment of the characteristics of the rubber bushing when in place.

Referring to FIG. 2 the flange 42′ is integrally formed as part of the spacer 34′ or is otherwise rigidly secured to it. The reduced end 36′ of the spacer 34′ is threaded to receive a nut 64. The resilient bushing 40 is confined between the flange 42′ and a washer 44′ which need not be countersunk. The nut 64 and the spacer 34′ hold the mount assembled corresponding to the tube 32 and flared washer 42 and 44 in FIG. 1. The position of the nut 64 on the threaded extension 36′ of the spacer determines the axial compression of the resilient bushing and the stress in its material. This can be adjusted easily at any time.

When the engine is put into the boat the mount is positioned vertically by the lower nut 28 on shaft 26. When the upper nut 30 is set fast to hold the engine down, it serves as a lock nut for the adjusting nut 64 to prevent inadvertent or vibrating change of an adjustment once made.

It is contemplated that all parts will be made of suitable known metal, except the resilient bushing which may be made of any suitable known elastomeric material, selected for its elasticity, hardness, resistance to deformation, damping factor, resistance to heat, cold, oils and salt water and other characteristics. Various known rubber compositions, natural or synthetic, and rubber-like plastic compositions are examples.

I claim:

1. In an anti-vibration mount, a tubular core support, a tubular spacer surrounding said core and axially fixed thereto, said core extending beyond the ends of said spacer, retaining washers at the ends of said spacer carried by said core and retained in position by flared ends of said core, a resilient bushing surrounding said spacer and retained between said washers, a tubular carrier surrounding and secured to said bushing, annular washers at the ends of said tubular carrier, a tubular adjusting sleeve surrounding and secured to said tubular carrier between said annular washers and rotatable thereon, and a support threaded on said adjusting sleeve.

2. In an anti-vibration mount, a tubular core, retaining washers carried at the ends of said core, a resilient bushing surrounding and secured to said core between said washers, a carrier surrounding and secured to said bushing, an externally threaded adjusting sleeve surrounding and secured to said tubular carrier and rotatable thereon, and a support threaded on said sleeve for axial adjustment of the support with respect to the bushing.

3. In an anti-vibration mount, a sleeve for attachment to a base and having a threaded axially extending end, a resilient bushing surrounding the sleeve, the threaded end of the sleeve extending beyond the bushing, a carrier surrounding and secured to the bushing, a radial flange secured to one end of the sleeve, a first nut threaded on the sleeve for applying an adjustable axially directed compressive force to the bushing, a rod extending through the sleeve for attaching the mount to a base, the rod being threaded adjacent the threaded end of the bushing and having a flange adjacent the opposite end of the sleeve, and a second nut threaded on the rod serving the combined functions of clamping the mount between the second mentioned flange and the nut and of locking the first nut to prevent its turning on the sleeve.

4. In an anti-vibration mount, a central tubular core assembly having a radially projecting washer fixedly mounted at one end thereof and a reduced diameter section at its opposite end, a resilient annular bushing snugly received upon said core assembly with one end of said bushing in face-to-face engagement with said washer, a pair of integral radially outwardly projecting annular shoulders at the opposite ends of said bushing, a tubular carrier surrounding and secured to the exterior of said bushing between said annular shoulders, annular washer elements engaged between each end of said carrier and the adjacent annular shoulder of said bushing, and washer means fixedly secured to said opposite end of said core assembly at an axial distance from said radially projecting washer less than the relaxed axial length of said resilient bushing for applying an axially directed compressive force to said bushing.

5. In an anti-vibration mount as defined in claim 4, the further improvement wherein said washer means comprises an annular spacer element of selected axial length disposed at said opposite end of said core assembly, and a radially projecting annular flange element fixedly coupled to said core assembly in engagement with said spacer at a preselected axial distance from said radially projecting washer for applying a predetermined and constant axially directed compressive force to said resilient bushing.

6. In an anti-vibration mount as defined in claim 4, the further improvement wherein said washer means comprises a nut threadably received upon said reduced diameter portion of said core assembly for applying an adjustable axially compressive force to said resilient bushing.

References Cited by the Examiner
UNITED STATES PATENTS

| 2,869,811 | 1/59 | Boschi | 248—9 |
| 2,890,846 | 6/59 | Schloss | 248—22 |
| 3,035,799 | 5/62 | Peirce | 248—15 |

FRANK L. ABBOTT, *Primary Examiner.*
CLAUDE A. LE ROY, *Examiner.*